United States Patent [19]

Urso

[11] Patent Number: 4,599,859
[45] Date of Patent: Jul. 15, 1986

[54] COMBINED STEAM GENERATOR AND ENGINE

[76] Inventor: Charles L. Urso, 215 Newton St., Waltham, Mass. 02154

[21] Appl. No.: 697,251

[22] Filed: Feb. 1, 1985

[51] Int. Cl.$^4$ .................. F01K 11/00; F01K 21/02
[52] U.S. Cl. ................................. 60/514; 165/115; 165/164
[58] Field of Search ................. 60/507–515; 122/40; 165/115, 164, 165

[56] References Cited

U.S. PATENT DOCUMENTS

| | | | |
|---|---|---|---|
| 1,309,102 | 7/1919 | Rector | 60/514 |
| 2,839,888 | 6/1958 | Mallory | 60/514 |
| 2,867,975 | 1/1959 | Mallory | 60/514 |
| 3,599,425 | 8/1971 | Lewis | 60/514 |
| 4,077,214 | 3/1978 | Burke | 60/514 |
| 4,220,005 | 9/1980 | Cutts | 60/514 |

Primary Examiner—Allen M. Ostrager
Attorney, Agent, or Firm—Hamilton, Brook, Smith & Reynolds

[57] ABSTRACT

A combined steam generator and engine including a means for spraying a finely atomized vaporizable liquid at all areas of an extensive heat exchanging surface. The opposite surface of walls providing the extensive heat exchanging surface is in direct contact with a heating fluid. The resulting steam is produced in a comparatively small steam generating volume in constantly open fluid communication with the expansible chamber of a cyclically operable engine. The invention provides rapid steam pressure build-up from a cold start, operates with a liquid or gaseous heating fluid, and has rapid response time to changing operating conditions. A sensitive control means alters the amount of vaporizable fluid that is sprayed in the generator, to control power output.

17 Claims, 6 Drawing Figures

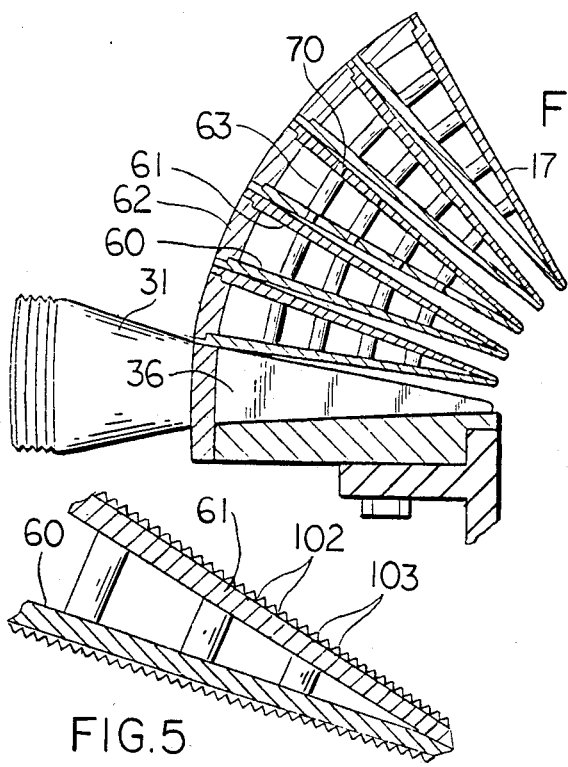
FIG. 3
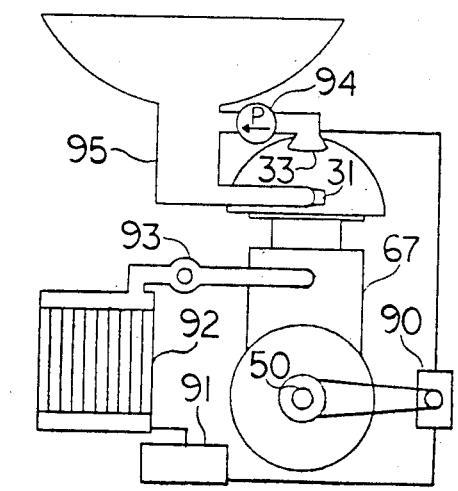
FIG. 5
FIG. 6
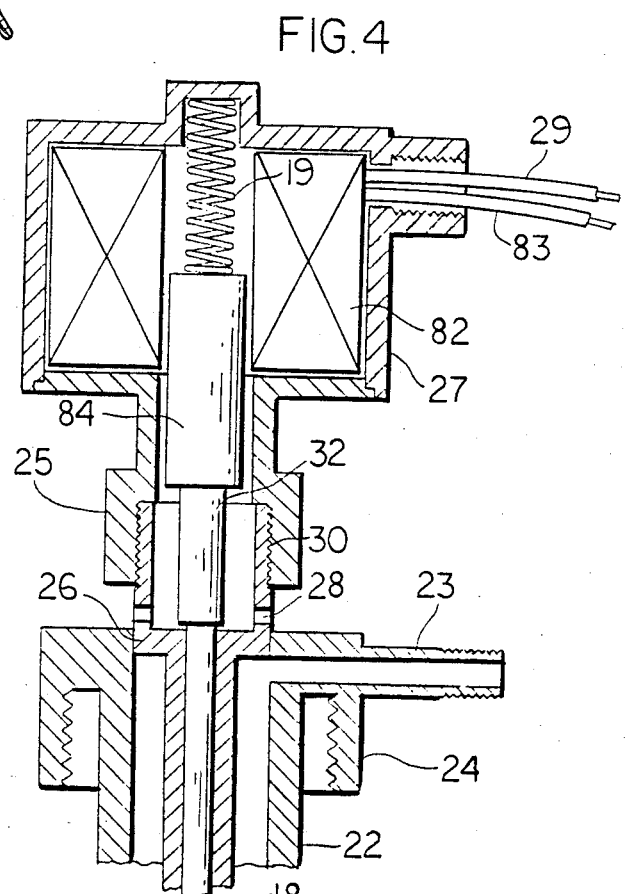
FIG. 4
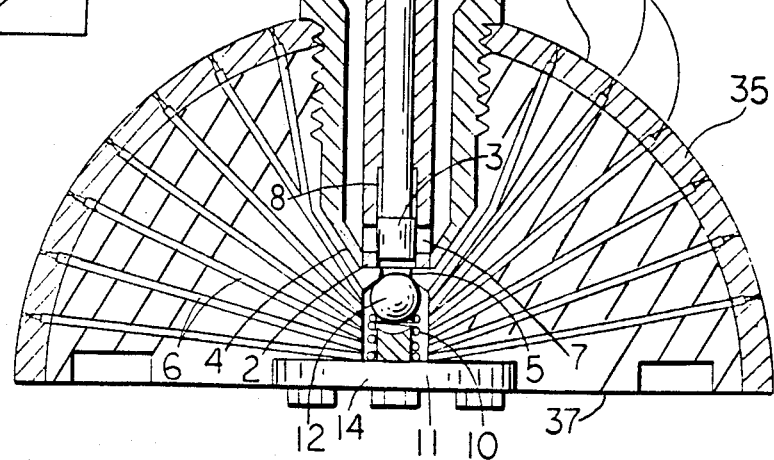

COMBINED STEAM GENERATOR AND ENGINE

BACKGROUND OF THE INVENTION

Power systems have been devised which include a steam generator in constantly open fluid communication with the expansible chamber of a cyclically operable engine. The engine generally is of the type having a rotor or piston which forms a movable wall of the chamber. A noncombustible vaporizable liquid, such as water, is injected into the heated generator during a portion of the engine cycle. In the case of those having a reciprocating piston, injecting the liquid usually begins just prior to the piston reaching top dead center. Steam is generated, pressurizing the chamber, to compel the piston into a power stroke. Injecting is stopped at some point during the power stroke. Means are provided to partially or fully exhaust the chamber and to return the piston, wherein the process is repeated.

This type of apparatus obviates the need for a steam inlet valve, but requires an inlet valve for the vaporizable liquid. An advantage of the valve swap is that it rids the system of a source of energy loss. For example, a liquid inlet valve orifice is much smaller than that of a steam inlet valve serving an expansible chamber of similar size. Therefore, much less force is required to open the liquid inlet valve than that of the steam inlet valve under high operational pressure. The force difference, in many cases, is in the order of hundreds of times.

Another advantage of the apparatus that no more steam is generated than the amount needed during a power stroke. This greatly reduces the hazard if the generator is accidentally ruptured; an important safety consideration for automotive use.

One of the simplest embodiments of an apparatus of the type described includes a hollow engine cylinder head. The cylinder head encloses one end of a cylinder such that the interior chamber of the head is in open fluid communication with an expansible chamber within the cylinder. Typically, the head is heated by means including a heating fluid passing through a jacket encircling the head chamber. An injector is disposed to inject the expansible liquid into the head chamber at intervals cyclically timed as described hereinbefore. However, the amount of energy that can be rapidly transferred from the heating fluid to generate and heat the steam is minimized by the lack of sufficient heat exchange surface within the head.

Other, more complex generators include parallel spaced fins, vanes, or the like, as heat exchange surfaces. However, the time required to transfer thermal energy longitudinally along fins, or vanes, results in a sluggish response to changing conditions; changes required for control purposes, for example.

The surfaces of tubes have also been used for heat exchanging in such generators. But, a quantity of tubes or tubing, as with fins or vanes, presents a heretofore unresolved problem of distributing a fine spray of vaporizable liquid directly onto a large total surface area in a relatively small steam generating chamber. Loops of tubing, layers of tubes, or layers of fins or vanes, tend to impede the sprayed liquid from directly contacting all the surfaces of respective adjacent loops or layers.

Suspended droplets of the liquid will flash into steam without surface contact if their temperature is sufficient for the given pressure. When this occurs, the pressure rises and more energy is required for vaporization of more droplets to continue the process. Additional droplets in the same environment could be vaporized, within the time constraints of the engine power stroke, by absorbing energy from direct contact with an appropriate heat exchanging surface.

SUMMARY OF THE INVENTION

The present invention provides a means for spraying a finely atomized vaporizable liquid at all areas of an extensive heat exchanging surface. The opposite surface of walls providing the extensive heat exchanging surface is in direct contact with a heating fluid. The resulting steam is produced in a comparatively small steam generating volume in constantly open fluid communication with the expansible chamber of a cyclically operable engine. The invention provides rapid steam pressure build-up from a cold start, operates with a liquid or gaseous heating fluid, and has rapid response time to changing operating conditions. A sensitive control means alters the amount of vaporizable fluid that is sprayed in the generator to control power output.

BRIEF DESCRIPTION OF THE DRAWINGS

FIG. 3 is a sectional view of a portion of the spiral conduit including the intact inlet guide and first triangular end plate;

FIG. 4 is a sectional view of the combined solenoid actuator, sprayer neck assembly, and sprayer head;

FIG. 5 is a sectional view of an embodiment of the spiral conduit having an array of pyramids on the exterior surfaces of its first and second walls; and FIG. 6 is a diagrammatic view of an embodiment of the invention connected to operational support devices as an operating system.

DESCRIPTION OF AN ILLUSTRATIVE EMBODIMENT

Figure 2:
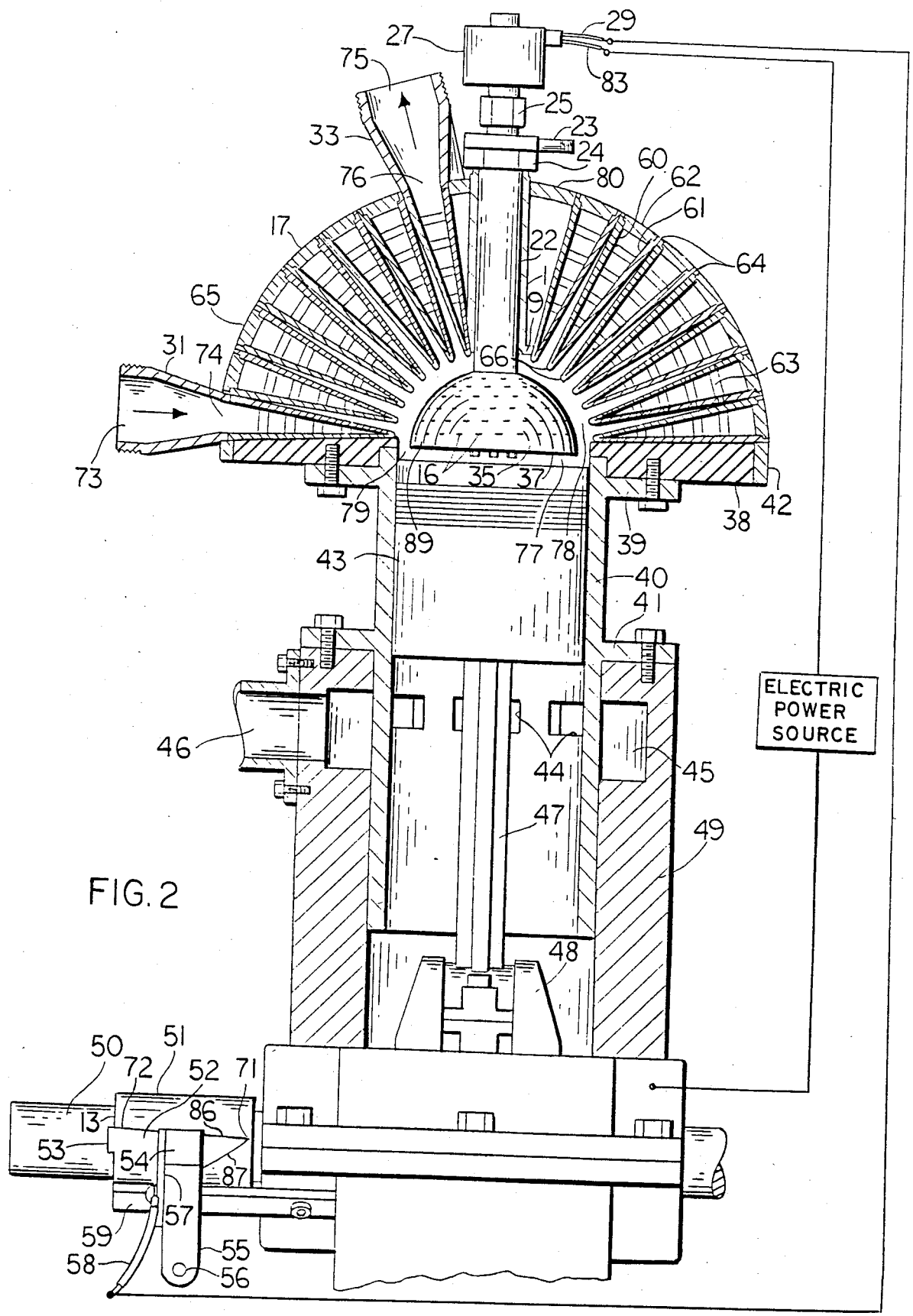
FIG. 2 is a partial sectional view of the embodiment with the crankshaft aligned with the plain of the page.

Referring to FIG. 2, the combined steam generator and engine (hereinafter called a steam generator/engine) includes a metal conduit 17 (FIGS. 2 and 3) spirally wound and having an exterior surface which defines a corrugated inner surface of a steam generating chamber 78. The aggregate of the spiral conduit forms a hollow hemisphere 65. The conduit having a first wall 60, a second wall 61, and a third wall 62, joined edge to edge such that a cross-section of the conduit resembles a triangle. The outer surface of the first and second walls 60, 61 defines the corrugated surface of the steam generating chamber 78. Along the width dimension, the thickness of the first and second walls 60,61 is tapered such that each wall thickens with decreasing distance to the third wall 62. A ridge 66 formed by the junction of the first wall 60 and the second wall 61, throughout the length of the conduit, points inwardly of the spiral toward a common point. A plurality of posts 63 are distributed throughout the interior of the conduit, wherein each post 63 is connected to, and spans between, the first wall 60 and the second wall 61. Connection is achieved by means of pegs 70 extending from end portions of the posts 63, as best seen in FIG. 3. The walls 60,61 having apertures in which the pegs 70 are fixedly received. Alternatively, the posts 63 can be without the pegs 70 and the walls can be without the apertures associated with the pegs 70, in which case an end of each of the posts 63 can be welded to either of the first or second walls 60,61 before assembly of the conduit.

Construction of the spiral conduit, including fluid inlet and outlet means, is achieved by first assembling pre-cut first wall 60, second wall 61, and posts 63. A first triangular end plate 36 (FIG. 3) is welded to seal the end of a first end portion of the conduit. A second triangular end plate (not shown), identical to the first, is similarly welded to seal the end of a second end portion of the conduit. After preliminary welding, the combination is spirally wound to the sphere portion configuration, without the third wall 62. Interior welding is completed at this stage. The third wall 62, being thicker than the other walls, is spirally cut from a portion of a spherical shell, wherein the third wall 62 resembles a spirally peeled rind of an orange. The third wall 62 is then fitted to span between the outer edges of the first and second walls 60,61, wherein the joints 64 (FIG. 2) of the three walls are welded from the exterior of the sphere portion 65. This results in each spiral loop of the conduit being sealed and fixedly joined to an adjacent loop.

Figure 1:
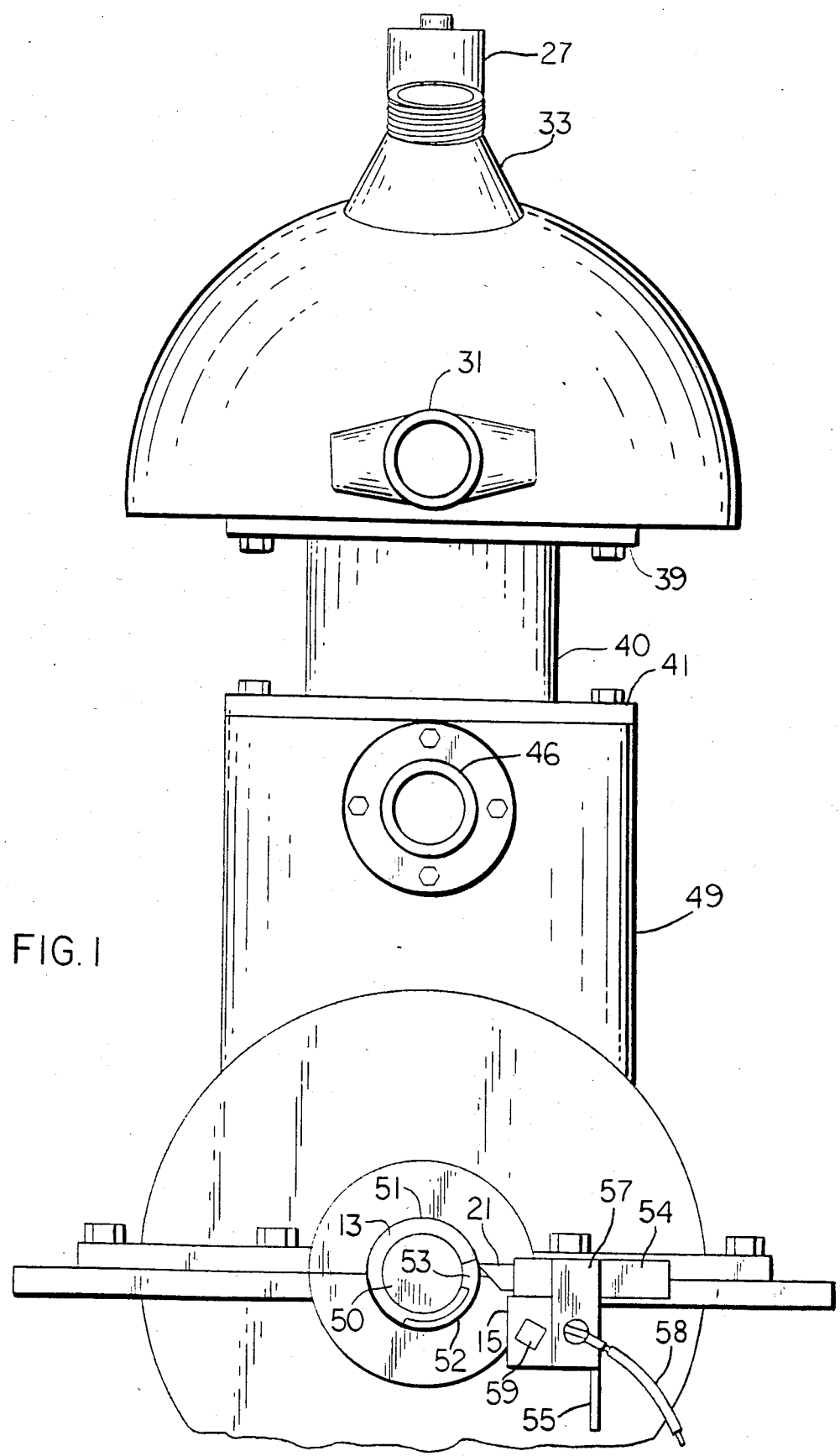
FIG. 1 is an elevation view of an embodiment of the invention with the crankshaft perpendicular to the plain of the page.

The conduit first end portion has an opening, formed in part by removal of its third wall portion, for receiving a portion of an inlet guide 31. Inlet guide 31 has an inlet mouth 73 and an inlet aperture 74, wherein the the boundary of the inlet aperture 74 defines an area at least as large as an area defined by the boundary of the inlet mouth 73 (FIGS. 1 and 2). Inlet aperture 74 being elongated and curved to conform to the shape of the conduit first end portion opening, wherein the former is connected to the latter by welding the inlet guide 31 to the sphere portion 65.

The conduit second end portion has an opening, formed in part by removal of its third wall portion, for receiving a portion of an outlet guide 33. Outlet guide 33 has an outlet mouth 75 and an outlet aperture 76, wherein the the boundary of the outlet aperture 76 defines an area at least as large as an area defined by the boundary of the outlet mouth 75. Outlet aperture 75 being elongated and curved to conform to the shape of the conduit second end portion opening, wherein the former is connected to the latter by welding the outlet guide 33 to the sphere portion 65.

Sphere portion 65 has an aperture which receives a sprayer support tube 1 which is welded therein (FIG. 2). An end portion of the support tube 1 includes a partial flange 9. Partial flange 9 is shaped to conform to the shape the ridge 66 of an end portion of the spiral conduit which surrounds the partial flange 9 and support tube 1 and is welded to the latter two members. Support structure 80, encircling and welded to an opposite end portion of support tube 1, is provided by an extension the sphere portion 65. Support structure 80 is cut from a portion of the spherical shell from which third wall 62 was procured.

Received within support tube 1 is a sprayer neck 22 which includes a heater tube 81 (FIG. 4). A first end portion of the heater tube 81 includes a nut 24 having a threaded portion in spaced relation to the main cylindrical body of the heater tube. The nut 24 screws over a threaded portion of the support tube 1. Extending laterally from an end portion of the nut 24 is an inlet nipple 23. A bore within the nipple 23 passes into the heater tube 81, thereby providing a sprayer neck inlet means for the intake of liquid into the heater tube 81. A threaded portion of the heater tube 81 screws into an internally threaded bore in a sprayer head 89. A second end portion of the the heater tube 81 is formed into a cone 4 having an end which defines an aperture. A valve tube 20, having a narrower outside diameter than the inside diameter of the heater tube 81, is fixedly coaxially positioned within the heater tube 81 in spaced relation to the same. The valve tube 20 has a first end portion and a second end portion, the latter having a piston bore 8. A valve piston 3 is in reciprocating engagement, with the valve tube 20, within the piston bore 8. The valve piston 3 forms a pressure seal with the wall of the piston bore 8, and the piston 3 may include conventional seals (not shown). A valve shaft 18 is slidably supported within the valve tube 20. The valve shaft 18 has a first end portion 32 and a second end portion, wherein the latter is fixed to valve piston 3. The first end portion 32 of the valve shaft 18 extends out of the first end portion of the valve tube 20. A plurality of apertures 7 pierce through the wall of the piston bore 8. Valve piston 3 is movable between a closed position, sealing the piston bore apertures 7, and an open position, leaving the piston bore apertures 7 open. A peripheral portion 2 of the second end portion of the valve tube 20 is press fitted into the heater tube cone aperture to form a seal. Thus, passage to the sprayer head 89 by liquid in the heater tube 81 requires that the piston 3 be in the open position. Hence, the liquid will pass through the piston bore apertures 7 into the valve tube second end portion and then into the sprayer head 89. The first end portion of the valve tube 20 includes a flange 26 which has a peripheral portion press fitted into the first end portion of the heater tube 81 to form a seal. Extending from the flange 26 is a connector nipple 30. Bleed apertures 28 allow liquid that should leak past piston 3 to to drain out.

The sprayer head 89 includes a spray manifold 37 having a distribution bore 11 connected to the outlet of the valve tube second end portion by way of a vestibular bore 5. The vestibular bore 5 is smaller in diameter than the distribution bore 11 and the periphery of the former serves as a valve seat for a check valve ball 12. A end of a helical spring 10 holds the ball 12 against the seat. A plate 14 holds an opposite end of the spring 10 in place. The plate 14 is fixed to the manifold 37 with screws, thereby sealing an end of the distribution bore 8. A plurality of capillary bores 6 emanate from the distribution bore 11, wherein each capillary bore 6 has an outer end. A nozzle dome 35 has a plurality of nozzles 16 machined into the dome 35 through its inner and outer surfaces. Each nozzle 16 has an inlet end and an elongated spray end. The nozzle dome 35 is precision fitted and fixed to the manifold 37, wherein each nozzle inlet end is connected to each respective outer end of a capillary bore 6 such that the spray end of each nozzle 16 is directed radially outward. The nozzles 16 are arranged in the configuration of a portion of a sphere conforming to the interior of the conduit sphere portion 65. The sprayer head 89 sphere portion and the conduit sphere portion 65 are in spaced relation to each other, are concentric, and have the same orientation. The sprayer nozzles 16 have elongated orifices which terminate at the elongated spray end to produce a fan shaped spray. As best seen in FIG. 2, the nozzles 16 are positioned such that each nozzle orifice is longitudinally aligned with a centerline between the ridges 66 of adjacent conduit loops to achieve broad distribution of the spray droplets onto the exterior of the first and second conduit walls 60,61. The effect of all the nozzles 16 is to spray at all areas of the corrugated inner surface of the conduit sphere portion 65.

Referring to FIG. 4, a solenoid actuator 27, for actuating the sprayer valve, includes a solenoid armature 84 fixed to the first end portion 32 of the valve shaft 18. A solenoid coil 82 having a central aperture receives the solenoid armature 84 for reciprocating longitudinal motion therein. A solenoid housing has a nut portion 25 which screws over the connector nipple 30. A helical spring 19, positioned between the armature 84 and the solenoid housing, urges the armature 84 to a first position, wherein the valve piston 3 is in the closed position. The first end portion 32 of the valve shaft 18, being wider than the inside diameter of the valve tube 20, provides a means to stop the armature 84 in the first position. When the solenoid coil 82 is energized by an appropriate electric power source, the armature 84 is compelled to move to a second position, wherein the valve piston 3 is in the open position.

Referring to FIG. 2, the conduit sphere portion 65 has an extending skirt 42. An inner circumferential edge of the skirt 42 is welded to a peripheral edge of a head flange 38, thereby forming a seal. The head flange has a central aperture defined by a circumferential edge which is fixedly sealed to a circumferential edge defining an entrance 79 of an expansible chamber 77. The expansible chamber 77 is defined by a piston enclosure or cylinder 40 and a movable piston 43 engaged therein. A cylinder flange 39 is bolted to the head flange 38, thereby connecting the steam generating chamber 78 with the expansible chamber 77. The cylinder 40 is received within a crankcase 49 and is secured by a second cylinder flange 41 bolted to the crankcase 49. A crankshaft 50 is rotatively supported by the crankcase 49. A conventional flywheel (not shown) is mounted to an end portion (not shown) of the crankshaft 50. The piston 43 is connected to the crankshaft 50, linked by a crank 48 and a connecting rod 47. Piston 43 is movable between a minimum chamber volume position (top dead center) and a maximum chamber volume position (bottom dead center). When the piston is at bottom dead center, steam in the cylinder 40 escapes through ports 44 into a jacket 45 and then through a steam exhaust pipe 46.

Referring to FIGS. 1 and 2, an insulated cylinder 51 is fixedly coaxially mounted on the crankshaft 50. The insulated cylinder 51 includes an electrically nonconductive portion 13, made of plastic or other nonconductive material, and an electrically conductive plate portion 52, made of metal or other conductive material. The plate portion 52 is fixedly imbedded into the nonconductive portion 13. Plate 52 is elongated in a direction parallel to the axis of the insulated cylinder 51, and the former has a curved surface contiguous with, and conforming to, the surface curvature of the nonconductive cylinder portion 13. Further, plate 52 has a tapered width such that an end portion of the insulated cylinder 51 includes a wide end 72 of the plate 52, and an opposite end portion of the insulated cylinder 51 includes a pointed end 71 of the plate 52. A tab portion 53 of the plate 52 is fixedly grounded to the crankshaft 50. The plate 52 has a leading edge 86 and a trailing edge 87, wherein both edges converge at the pointed end 71 of the plate. An imaginary line on the plate surface, parallel to the insulated cylinder axis and passing through the pointed end 71 of the plate surface, divides the plate 52 into two portions such that one plate portion has the leading edge 86 and the other plate portion has the trailing edge 87. The widest end of the leading edge plate portion constitutes 7 degrees of the circular periphery of the end of the insulated cylinder 51 viewed from FIG. 1. The widest end of the trailing edge plate portion constitutes 125 degrees of the circular periphery of the viewed end of insulated cylinder 51. An electrically conductive brush 21 is longitudinally slidable within a brush holder 54. A bracket 57 extends from the brush holder 54 and is used to mount the latter to an electrically insulating block 15 which is made of plastic. The holder 54 and the bracket 57 are electrically conductive. Block 15 has a square-shaped aperture to receive a shaft 59 which has a square-shaped cross-section. The shaft 59 is fixedly mounted to the crankcase 49 such that the shaft 59 is parallel to the axis of the insulated cylinder 51 (FIGS. 1 and 2). A spring (not shown) within the holder 54 urges the brush 21 into yielding contact with the surface of the insulated cylinder 51. Block 15 is slidable on the shaft 59 such that the brush 21 can be moved longitudinally along the insulated cylinder 51 at selective positions. The insulated cylinder 51 is positioned on the crankshaft 50 such that the leading edge plate portion contacts the brush 21 when the piston 43 is near the end of a piston return stroke (near top dead center) and the trailing edge plate portion breaks contact with the brush 21 during a piston power stroke. The exact time of contact and break of contact, relative to the piston cycle, is determined by the selective position of the brush 21. In any case, when the piston is at top dead center, the brush 21 is on the mentioned imaginary line. A tongue 55, having an aperture 56, extends from the insulating block 15 and provides a means of connecting the slidable assembly to linkage (not shown) for remotely controlling the power output of the invention.

Other details of the engine portion of the invention, such as seals, bearings, and lubrication, are conventional.

Operation of the steam generator/engine requires connecting it with support devices as described in the following paragraphs.

Referring to FIG. 2, an electric power source, appropriate for energizing the solenoid actuator 27, has one of its terminals connected to one of the solenoid connector wires 83. The opposite terminal of the power source is connected to the crankcase 49. A brush connector wire 58 is connected to the opposite solenoid connector wire 29.

A source of forced heating fluid is connected to the inlet guide 31. An example is shown in FIG. 6. A pump 94 circulates a noncombustible heating liquid through the steam generator/engine 67 in a closed circuit. A solar furnace 95 heats the liquid which is pumped into the inlet guide 31. After passing out of outlet guide 33, the liquid returns to the furnace 95 for reheating.

Also required for operating the invention is a source of pressurized noncombustible vaporizable liquid, such as water or Freon, connected to inlet nipple 23 (FIG. 2). In the example shown in FIG. 6, the vaporizable liquid is pressurized by a constant high pressure pump 90, belt driven by the crankshaft 50. The vaporizable liquid supply is from the reservoir 91.

The steam generator/engine may be started by a starter motor (not shown), or other means, connected to the crankshaft 50 to rotate the same. The starter should have sufficient torque to operate the pump 90. Crankshaft 50 is rotated such that the plate leading edge 86 (FIG. 2) precedes the trailing edge 87. As the piston 43 approaches top dead center, the plate leading edge 86 makes contact with the brush 21 to actuate the spray mechanism. Preheated liquid in the heater tube 81 (FIG. 4) is then sprayed out of the nozzles 16. Some of the sprayed droplets are vaporized prior to reaching the spiral conduit. The remainder are vaporized by direct contact with conduit surface. The check valve, including the spring loaded ball 12, serves to prevent backward fluid motion in the event that pressure in the distribution bore 11 exceeds pressure in the sprayer neck 22. During the piston power stroke, the plate 52 breaks contact with the brush 21 to stop the spraying. As the piston approaches bottom dead center, the ports 44 (FIG. 2) are opened and the steam is partially exhausted from the cylinder 40. The flywheel returns the piston to repeat the cycle. As previously mentioned, the exact time of contact and break of contact of the plate 52 with the brush 21, relative to the piston cycle, is determined by the selective position of the brush 21. Contact of the leading edge 86 with the the brush 21 varies between 0 and 7 degrees of the crankshaft rotation prior to top dead center position. Break of contact of the plate trailing edge 87 with the brush 21 occurs between 0 and 125 degrees of the crankshaft rotation after top dead center position. Hence, contact of the leading edge 86 advances and break of contact with the trailing edge is retarded by moving the brush 21 toward the widest end of the plate 52. Moving the brush 21, therefore, provides a selective means of controlling power and speed. Again referring to FIG. 6, steam exhausted from the steam generator/engine 67 powers a motor 93 and is then condensed in the condenser 92. The resulting liquid is returned to the reservoir 91. The motor 94 may be used to power a small device in the system, such as a condenser fan (not shown). Other devices in the system may be powered or charged by an electric generator (not shown) driven by the crankshaft 50.

The heating fluid is first introduced in the spiral conduit loops having the greatest diameters so that they contain the hottest heating fluid. Heat conducted in the third wall aggregate then flows in a latitudinal direction (transverse direction, relative to the direction of heating fluid flow) to converge toward the conduit loops having the shorter diameters. With the thicker third wall 62, being in conductive communication with the first and second walls 60,61, the energy is distributed. Thus, the short conductive heat transfer route supplements the long heating fluid convection route to effectively distribute the thermal energy throughout the conduit. Insulating the exterior of the sphere portion 65 would, of course, inhibit radiant heat losses.

Within the spiral conduit, the posts 63 serve three functions:

(1) They provide structural strength for the first and second walls 60,61 against the crushing effect of steam pressure.

(2) They create turbulent flow of the heating fluid to inhibit the formation of boundary layers (also called fluid films) and thus increase heat transfer.

(3) They increase surface contact with the heating fluid to help transfer energy to the conduit first and second walls 60,61.

The system of FIG. 6 is intended as an example of one of the operating systems in which the invention can be utilized, but does not limit applicability of the device.

ADAPTATIONS AND MODIFICATIONS OF THE INVENTION

The embodiment of the invention described and shown may be modified for specific employment. For example, an application may involve heating fluid comprising combustion gases from a burner equipped with a blower for blowing the gases through the spiral conduit. In such an application it may be desirable to widen the spiral conduit third wall 62 relative to the width of the the first and second walls 60,61. This will increase the relative size of the conduit cross-section and decrease flow resistance to the heating fluid. Correspondingly, the inlet and outlet guides 31,33 would be relatively larger and the conduit would have fewer spiral loops.

For relatively high pressure requirements, the spiral conduit could include the above modification with thicker conduit walls. The exterior surface area of a thicker walled spiral conduit, as shown in FIG. 5, can be increased by cutting V-shaped parallel grooves 102 into the first and second walls 60,61. Similar grooves are cut perpendicular to the first, thereby forming an array of four sided pyramids 103. The width of each groove 102 being greater than the width of individual sprayed droplets.

A thermostat (not shown) installed in the steam generating chamber 78 could provide a feedback means for automatically controlling a burner flame or other heat source for the heating fluid. Operational control of the invention can also include other conventional controlling devices. For example, the rotation of the crankshaft 50 and the pressure within the expansible chamber 77 can be monitored by conventional transducer devices which can be electrically connected to the actuator 27. The precise time at which the actuator 27 is energized can then be advanced or retarded by feedback from the monitored steam generator/engine performance.

In a multi-cylinder embodiment of the invention (not shown), each piston cylinder could have a spring loaded brush (similar to brush 21) mounted in yielding contact with the insulated cylinder 51. Each brush would be electrically connected to a solenoid actuator (similar to actuator 27) for each respective piston cylinder. For example, in a two cylinder embodiment with a 180 degree phase difference between the power stroke of each piston, two brushes 180 degrees apart, could be mounted in contact with the insulated cylinder 51.

If preferred, the solenoid actuator 27 can be replaced by mechanical linkage connected between the crankshaft 50 and the valve shaft first end portion 32 to operate the valve piston 3. Such mechanical linkage could include, for example, a cam mounted on crankshaft 50 and an appropriate cam follower linked to the valve shaft first end portion 32.

The possibility exists that as an alternative to constructing the spiral conduit from metal, as described above, that it could be cast is sections from high temperature ceramic materials. This would give the advantage of withstanding extremely high operational temperatures of over 1800 degrees F. Appropriate conventional modifications to the engine portion for high temperature operation would then be necessary.

It should be mentioned that the invention can be adapted to expansible chamber devices other than the cylinder type. The expansible chambers of rotary vane motors, for example, can incorporate the invention.

It is understood that various other modifications may be made without departing from the spirit of the invention as claimed.

What I claim is:

1. A steam generator/engine comprising:
   a conduit spirally wound and having an exterior surface which defines a corrugated surface of a steam generating chamber surrounded by the conduit;
   conduit inlet and outlet means for passing heating fluid through the conduit;
   sprayer means for spraying noncombustible vaporizable liquid directly at all areas of the corrugated surface to generate steam;
   a piston enclosure;
   a piston slidably supported within the enclosure to form an expansible chamber, the piston movable between a minimum chamber volume position and a maximum chamber volume position;
   means for connecting the steam generating chamber to the expansible chamber wherein the steam generating chamber is in constantly open fluid communication with the expansible chamber so that the piston moves from the minimum volume position to the maximum volume position when compelled by steam pressure to produce a piston power stroke;
   means for returning the piston to the minimum volume position;
   means for connecting the piston to a power utilizing mechanism for work use;
   means for actuating spraying; and
   means for adjustably synchronizing the means for actuating spraying such that spraying starts and stops at cyclically timed intervals to sustain operation and to control the power performance of the generator/engine.

2. The steam generator/engine as defined in claim 1 further comprising a plurality of posts distributed in fixed positions throughout the interior of the conduit wherein each post spans between opposing inner surfaces of the conduit.

3. The steam generator/engine as defined in claim 1 further comprising the conduit walls having grooves cut into their surfaces for increasing surface area.

4. The steam generator/engine as defined in claim 1 wherein each spiral loop of the conduit is fixedly joined along its edges to an adjacent loop.

5. The steam generator/engine as defined in claim 1 wherein the conduit comprises first, second, and third walls, joined edge to edge such that a cross-section of the conduit is substantially triangular.

6. The steam generator/engine as defined in claim 5 wherein the thickness of the first and second walls are tapered along the wall width such that each wall thickens with decreasing distance to the third wall.

7. The steam generator/engine as defined in claim 5 wherein the conduit inlet and outlet means comprise:
   a first triangular end plate fixedly sealing an end of a first end portion of the conduit, the conduit first end portion having an opening adjacent the first end plate, formed substantially by removal of a portion of its third wall;
   a second triangular end plate fixedly sealing an end of a second end portion of the conduit, the conduit second end portion having an opening adjacent the second end plate, formed substantially by removal of a portion of its third wall;
   an inlet guide having an inlet mouth and an inlet aperture wherein the boundary of the inlet aperture defines an area at least as large as an area defined by the boundary of the inlet mouth, the inlet aperture conforming to the shape of the conduit first end portion opening and connected to the same; and
   an outlet guide having an outlet mouth and an outlet aperture wherein the boundary of the outlet aperture defines an area at least as large as an area defined by the boundary of the outlet mouth, the outlet mouth conforming to the shape of the conduit second end portion opening and connected to the same.

8. The steam generator/engine as defined in claim 1 wherein the sprayer means comprises a plurality of nozzles each of which has an elongated orifice to produce a fan-shaped spray, the nozzles positioned such that the long dimension of each nozzle orifice is longitudinally aligned with a centerline between adjacent conduit loops to achieve broad distribution of the spray droplets onto the conduit surface.

9. The steam generator/engine as defined in claim 1 wherein the means for adjustably synchronizing the means for actuating spraying comprises:
   a rotatably mounted insulated cylinder comprising an electrically nonconductive cylinder portion, and an electrically conductive plate having a curved surface contiguous with and conforming to the surface curvature of the nonconductive cylinder portion, the plate having a tapered width such that an end portion of the insulated cylinder includes a wide end of the plate, and an opposite end portion of the insulated cylinder includes a pointed end of the plate, the plate having a leading edge and a trailing edge;
   an electrically conductive brush slidably mounted to be selectively moved along a direction parallel to the insulated cylinder axis;
   spring means for urging the brush into yielding contact with the surface of the insulated cylinder;
   means for linking the insulated cylinder to the engine piston such that one cycle of the piston results in one revolution of the insulated cylinder wherein the plate leading edge contacts the brush when the piston is near the end of its return stroke and the plate trailing edge breaks contact with the brush during the piston power stroke, the time of contact and break of contact relative to the piston cycle being determined by the selective position of the brush;
   a valve operatively connected with the sprayer means, the valve having open and closed positions to, respectively, start and stop the spraying;
   an electrically powered valve actuator;
   means for operatively linking the actuator with the valve such that the actuator, when electrically energized, opens the valve;
   means for closing the valve when the actuator is not energized;
   means for electrically connecting the actuator between the brush and a terminal of an electric power source; and
   means for electrically connecting the plate to the opposite terminal of the electric power source.

10. A steam generator/engine comprising:
    a conduit spirally wound and having an exterior surface which defines a corrugated surface of a steam generating chamber surrounded by the conduit, the aggregate of the spiral conduit forming a substantial portion of a sphere;

conduit inlet and outlet means for passing heating fluid through the conduit;

a sprayer head positioned within the steam generating chamber for spraying noncombustible vaporizable liquid directly at all areas of the corrugated surface to generate steam;

means for connecting the sprayer head to a source of the vaporizable liquid;

a piston enclosure;

a piston slidably supported within the enclosure to form an expansible chamber, the piston movable between a minimum chamber volume position and a maximum chamber volume position;

means for connecting the steam generating chamber to the expansible chamber wherein the steam generating chamber is in constantly open fluid communication with the expansible chamber so that the piston moves from the minimum volume position to the maximum volume position when compelled by steam pressure to produce a piston power stroke;

means for returning the piston to the minimum volume position;

means for connecting the piston to a power utilizing mechanism for work use;

means for actuating spraying; and means for adjustably synchronizing the means for actuating spraying such that spraying starts and stops at cyclically timed intervals to sustain operation and to control the power performance of the generator/engine.

11. The steam generator/engine as defined in claim 10 wherein the conduit comprises first, second, and third walls, joined edge to edge such that a cross-section of the conduit is substantially triangular wherein a ridge formed by the junction of the first and second walls, throughout the length of the conduit, points inwardly of the spiral toward a common point.

12. The steam generator/engine as defined in claim 10 wherein the sprayer head comprises a plurality of nozzles arranged in a configuration of a substantial portion of a sphere conforming to the interior the steam generating chamber and in spaced relation to the same.

13. The steam generator/engine as defined in claim 12 wherein the sprayer head includes a spray manifold having a distribution bore connected to the vaporizable liquid source, and a plurality of capillary bores emanating from the distribution bore wherein each capillary bore has an outer end connected to each nozzle, respectively, such that the spray end of each nozzle is directed radially outward.

14. The steam generator/engine as defined in claim 10 wherein the sprayer head includes a check valve for preventing backward fluid motion therein.

15. The steam generator/engine as defined in claim 10 further comprising:

a heater tube connected to the sprayer head;

a valve tube having a narrower outside diameter than the inside diameter of the heater tube, the valve tube fixedly positioned within the heater tube in spaced relation to the same, the valve tube having a piston bore and a plurality of apertures piercing the wall of the piston bore;

a valve piston slidably supported within the valve tube piston bore for reciprocating motion therein, the valve piston movable between a closed position sealing the piston bore apertures and an open position leaving the piston bore apertures open;

means for connecting first and second end portions of the valve tube with first and second end portions of the heater tube, respectively, such that passage into the sprayer head by liquid in the heater tube requires that the valve piston be in the open position wherein the liquid passes through the piston bore apertures into the valve tube and then into the sprayer head; and means for introducing the vaporizable liquid into the heater tube.

16. The steam generator/engine as defined in claim 15 wherein the means for actuating spraying comprises:

a solenoid having a central aperture;

a solenoid armature received within the solenoid aperture for reciprocating longitudinal motion therein, the armature fixedly connected to the valve piston;

spring means for urging the armature to a first position wherein the valve piston is in the closed position; and means for energizing the solenoid to move the armature to a second position wherein the valve piston is in the open position whereby spraying commences.

17. A steam generator comprising:

a conduit for carrying a heating fluid, the conduit being spirally wound and having an exterior surface which defines a corrugated inner surface of a steam generating chamber surrounded by the conduit, the aggregate of the spiral conduit forming a substantial portion of a sphere; and means for spraying a liquid directly at all areas of the corrugated surface to generate steam.

* * * * *